United States Patent
Chakraborty et al.

(10) Patent No.: US 11,716,633 B2
(45) Date of Patent: **\*Aug. 1, 2023**

(54) LICENSED SUPPLEMENTAL UPLINK AS FALLBACK WITH UNLICENSED UPLINK AND DOWNLINK

(71) Applicant: QUALCOMM Incorporated, San Diego, CA (US)

(72) Inventors: Kaushik Chakraborty, San Diego, CA (US); Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,871

(22) Filed: Jun. 10, 2022

(65) Prior Publication Data

US 2022/0377739 A1  Nov. 24, 2022

Related U.S. Application Data

(63) Continuation of application No. 16/581,579, filed on Sep. 24, 2019, now Pat. No. 11,363,465.

(Continued)

(51) Int. Cl.
*H04J 1/16* (2006.01)
*H04W 16/14* (2009.01)
(Continued)

(52) U.S. Cl.
CPC .......... *H04W 16/14* (2013.01); *H04W 24/04* (2013.01); *H04W 72/0453* (2013.01); *H04W 72/23* (2023.01); *H04W 74/0808* (2013.01)

(58) Field of Classification Search
USPC ..... 370/216, 217, 218, 221, 225, 235.1, 235
See application file for complete search history.

(56) References Cited

U.S. PATENT DOCUMENTS 11,363,465 B2  6/2022 Chakraborty et al.
2006/0234766 A1  10/2006 Gillin et al.
(Continued)

FOREIGN PATENT DOCUMENTS

| WO | 2012074343 A2 | 6/2012 |
| WO | 2017171523 A1 | 10/2017 |
| WO | 2018029659 A1 | 2/2018 |

OTHER PUBLICATIONS

International Preliminary Report on Patentability—PCT/US2019/052976, The International Bureau of WIPO—Geneva, Switzerland, dated Apr. 8, 2021.

(Continued)

*Primary Examiner* — Chuong T Ho
(74) *Attorney, Agent, or Firm* — Hayes and Boone, LLP

(57) ABSTRACT

Wireless communications systems and methods related to communications in a network that supports data transmitted in an unlicensed frequency band and a licensed frequency band are provided. A first wireless communication device communicates, with a second wireless communication device, a configuration indicating a first resource in an unlicensed frequency band and a second resource in a licensed band. The first wireless communication device communicates, with the second wireless communication device in the unlicensed frequency band, a first communication signal based on the configuration. The first wireless communication device communicates with the second wireless communication device in the licensed frequency band, a second communication signal based on at least one of a channel status of the unlicensed frequency band or a trans- (Continued)

mission parameter associated with at least one of the first communication signal or the second communication signal.

23 Claims, 9 Drawing Sheets

Related U.S. Application Data

(60) Provisional application No. 62/736,751, filed on Sep. 26, 2018.

(51) Int. Cl.
*H04W 24/04* (2009.01)
*H04W 74/08* (2009.01)
*H04W 72/0453* (2023.01)
*H04W 72/23* (2023.01)

(56) References Cited

U.S. PATENT DOCUMENTS

| | | |
|---|---|---|
| 2011/0019541 A1 | 1/2011 | Li et al. |
| 2014/0362780 A1 | 12/2014 | Malladi et al. |
| 2016/0095129 A1 | 3/2016 | Hoyhtya et al. |
| 2017/0048861 A1 | 2/2017 | Choi et al. |
| 2017/0086213 A1 | 3/2017 | Kalhan |
| 2017/0202043 A1 | 7/2017 | Seo |
| 2017/0251454 A1 | 8/2017 | Yang et al. |
| 2018/0049037 A1* | 2/2018 | Lopez-Perez ......... H04W 52/50 |
| 2018/0139615 A1 | 5/2018 | Cui et al. |
| 2018/0175975 A1* | 6/2018 | Um ........................ H04W 16/14 |
| 2018/0175978 A1 | 6/2018 | Beidas et al. |
| 2018/0184317 A1 | 6/2018 | Li et al. |
| 2018/0278373 A1 | 9/2018 | Wang et al. |
| 2018/0317256 A1 | 11/2018 | Um et al. |
| 2018/0324872 A1 | 11/2018 | Babaei et al. |
| 2019/0053265 A1 | 2/2019 | Kim et al. |
| 2019/0109677 A1 | 4/2019 | Wang et al. |
| 2019/0110293 A1 | 4/2019 | Li et al. |
| 2019/0124614 A1 | 4/2019 | Li et al. |
| 2019/0159251 A1* | 5/2019 | Li ............................ H04L 1/18 |
| 2019/0181989 A1* | 6/2019 | Li ........................ H04W 16/14 |
| 2019/0289621 A1 | 9/2019 | Li et al. |
| 2019/0297621 A1 | 9/2019 | Li |
| 2020/0008238 A1 | 1/2020 | Huang et al. |
| 2020/0037277 A1* | 1/2020 | Huang ............. H04W 56/0015 |
| 2020/0037359 A1* | 1/2020 | Wang .................... H04L 1/1812 |
| 2020/0100116 A1 | 3/2020 | Chakraborty et al. |
| 2020/0136708 A1 | 4/2020 | Pan et al. |
| 2020/0170004 A1* | 5/2020 | Si .......................... H04W 16/14 |
| 2020/0187253 A1 | 6/2020 | Cui et al. |
| 2020/0281012 A1 | 9/2020 | Behravan et al. |
| 2020/0288498 A1 | 9/2020 | Li et al. |
| 2021/0006382 A1* | 1/2021 | Zhou .................... H04L 5/0098 |
| 2021/0176665 A1 | 6/2021 | Lan et al. |

OTHER PUBLICATIONS

International Search Report and Written Opinion—PCT/US2019/052976—ISA/EPO—dated Dec. 13, 2019.
Taiwan Search Report—TW108134749—TIPO—dated Feb. 1, 2023.

* cited by examiner

LICENSED SUPPLEMENTAL UPLINK AS FALLBACK WITH UNLICENSED UPLINK AND DOWNLINK

CROSS REFERENCE TO RELATED APPLICATIONS & PRIORITY CLAIM

This application is a continuation of U.S. application Ser. No. 16/581,579, filed Sep. 24, 2019, which claims the benefit of U.S. Provisional Patent Application No. 62/736,751 filed Sep. 26, 2018, each of which is hereby incorporated by reference in their entirety.

TECHNICAL FIELD

This application relates to wireless communication systems, and more particularly to communications in a network deployed over an uplink (UL) and downlink (DL) unlicensed band in addition to a UL licensed band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR-unlicensed (NR-U) may refer to the deployment of an NR cell in an unlicensed spectrum. For example, an NR cell may be deployed in a standalone NR-U mode over one or more unlicensed frequency bands. NR-U may also support cell deployments using various combinations of unlicensed bands and licensed bands. For example, an NR cell may be deployed using carrier aggregation to combine an NR licensed band with an NR unlicensed band, where the NR licensed band may function as an anchor carrier or a primary cell (PCell) and the unlicensed band may function as a supplemental carrier or a secondary cell (SCell). The SCell may include an uplink (UL) component carrier and a downlink (DL) component carrier. Alternatively, the SCell may include a DL component carrier only. In another example, an NR cell may be deployed using dual connectivity between an LTE licensed band and an NR unlicensed band, where the LTE licensed band may function as a PCell and the NR unlicensed band may function as a SCell. In yet another example, an NR cell may be deployed in a DL unlicensed band and a UL licensed band.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a configuration indicating a first resource in an unlicensed frequency band and a second resource in a licensed band; communicating, by the first wireless communication device with the second wireless communication device in the unlicensed frequency band, a first communication signal based on the configuration; and communicating, by the first wireless communication device with the second wireless communication device in the licensed frequency band, a second communication signal based on at least one of a channel status of the unlicensed frequency band or a transmission parameter associated with at least one of the first communication signal or the second communication signal.

In an additional aspect of the disclosure, an apparatus includes a transceiver configured to communicate, by a first wireless communication device with a second wireless communication device, a configuration indicating a first resource in an unlicensed frequency band and a second resource in a licensed band; further configured to communicate, by the first wireless communication device with the second wireless communication device in the unlicensed frequency band, a first communication signal based on the configuration; and further configured to communicate, by the first wireless communication device with the second wireless communication device in the licensed frequency band, a second communication signal based on at least one of a channel status of the unlicensed frequency band or a transmission parameter associated with at least one of the first communication signal or the second communication signal.

In an additional aspect of the disclosure, a computer-readable medium includes program code recorded thereon, the program code including code for causing a first wireless communication device to communicate, with a second wireless communication device, a configuration indicating a first resource in an unlicensed frequency band and a second resource in a licensed band; code for causing the first wireless communication device to communicate, with a second wireless communication device in the unlicensed frequency band, a first communication signal based on the configuration; and code for causing the first wireless communication device to communicate, with the second wireless communication device in the licensed frequency band, a second communication signal based on at least one of a channel status of the unlicensed frequency band or a transmission parameter associated with at least one of the first communication signal or the second communication signal.

In an additional aspect of the disclosure, an apparatus includes means for communicating, with a second wireless communication device, a configuration indicating a first resource in an unlicensed frequency band and a second resource in a licensed band; means for communicating, with a second wireless communication device in the unlicensed frequency band, a first communication signal based on the configuration; and means for communicating, with the second wireless communication device in the licensed frequency band, a second communication signal based on at least one of a channel status of the unlicensed frequency band or a transmission parameter associated with at least one of the first communication signal or the second communication signal.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
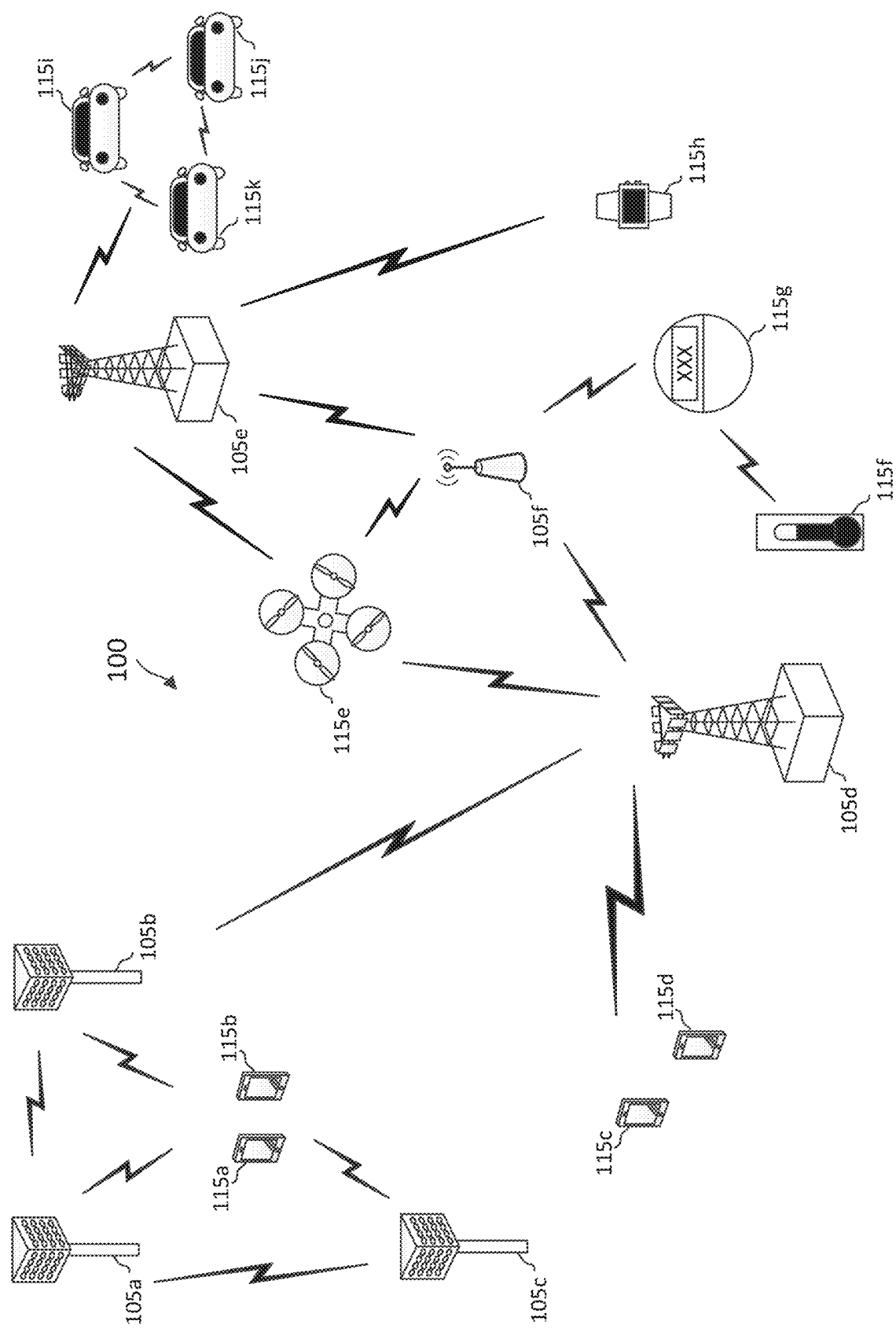
FIG. 1 illustrates a wireless communication network according to one or more embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-PUMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (BUD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The present application describes mechanisms for improving communications between wireless devices in unlicensed band, which may include a UL unlicensed band and/or a DL unlicensed band, by utilizing a supplemental UL (SUL) licensed band. The licensed band may be used to provide more efficient operation in communications between communication devices and may be leveraged to benefit the operation in the unlicensed UL and/or DL operation. Transmission of the UL data may be an autonomous (i.e., unscheduled) UL transmission or a scheduled UL transmission. The UE transmits the UL data in the licensed frequency band based on at least some conditions in the unlicensed frequency band.

In an embodiment, the network 100 may operate over shared frequency bands or unlicensed frequency bands, for example, at about 3.5 gigahertz (GHz), sub-6 GHz or higher frequencies in the mmWav band. Operations in unlicensed spectrum may include DL transmissions and/or UL transmissions. A UL transmission (e.g., autonomous UL via a dynamic UL grant or scheduled UL transmission via a configured UL grant) in the licensed frequency band may occur under various circumstances. A grantless or grant-free uplink transmission is an unscheduled transmission, performed on the channel without an UL grant.

In some examples, the BS configures resources (e.g., PUCCH resources) on an unlicensed frequency band and a licensed frequency band. The BS may provide the UE with an indication to transmit UL data on the unlicensed frequency band or a licensed frequency band, depending on various factors.

In an example, a UE operating in a shared or unlicensed frequency spectrum may perform a listen-before-talk (LBT) procedure (e.g., clear channel assessment (CCA)) prior to communicating in order to determine whether the channel is available. If the channel is available, the UE checks out the channel and performs a UL transmission (e.g., autonomous UL or scheduled UL transmission) in the channel. If the channel is not available, the UE may back off and perform the LBT procedure again at a later point in time. Additionally, the UE may operate in a licensed frequency band. The UE does not need to contend for access to the channel for the licensed frequency band. It may be advantageous for the UE to use the licensed frequency band as a fallback for the unlicensed UL operation. In this way, robustness and reliability may be provided in these communications between the BS and the UE. In another example, the BS performs a LBT that results in a LBT fail, and accordingly does not transmit a DL channel indication to the UE. If the UE does not detect the DL channel indication from the UE, the UE may transmit UL in the licensed frequency band. In another example, the UE transmits UL data if the UE determines that two communication signals (e.g., DL data and an ACK/NACK for the DL data) do not fall within the same TXOP based on a transmission parameter (e.g., TXOP duration), the UE may transmit one of the communications signals (e.g., ACK/NACK for the DL data) in the licensed frequency band.

FIG. 1 illustrates a wireless communication network 100 according to one or more embodiments of the present disclosure. The network 100 may be a 5G network. The network 100 includes a number of BSs 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (PD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. After establishing the connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may employ a LBT procedure to reserve transmission opportunities (TXOPs) in the share medium for communications. TXOPs may be non-continuous in time and may refer to an amount of time a station can send frames when it has won contention for the wireless medium. Each TXOP may include a plurality of slots. The BS 105 or the UE 115 may perform an LBT in the frequency band prior to transmitting in the frequency band.

Figure 2:
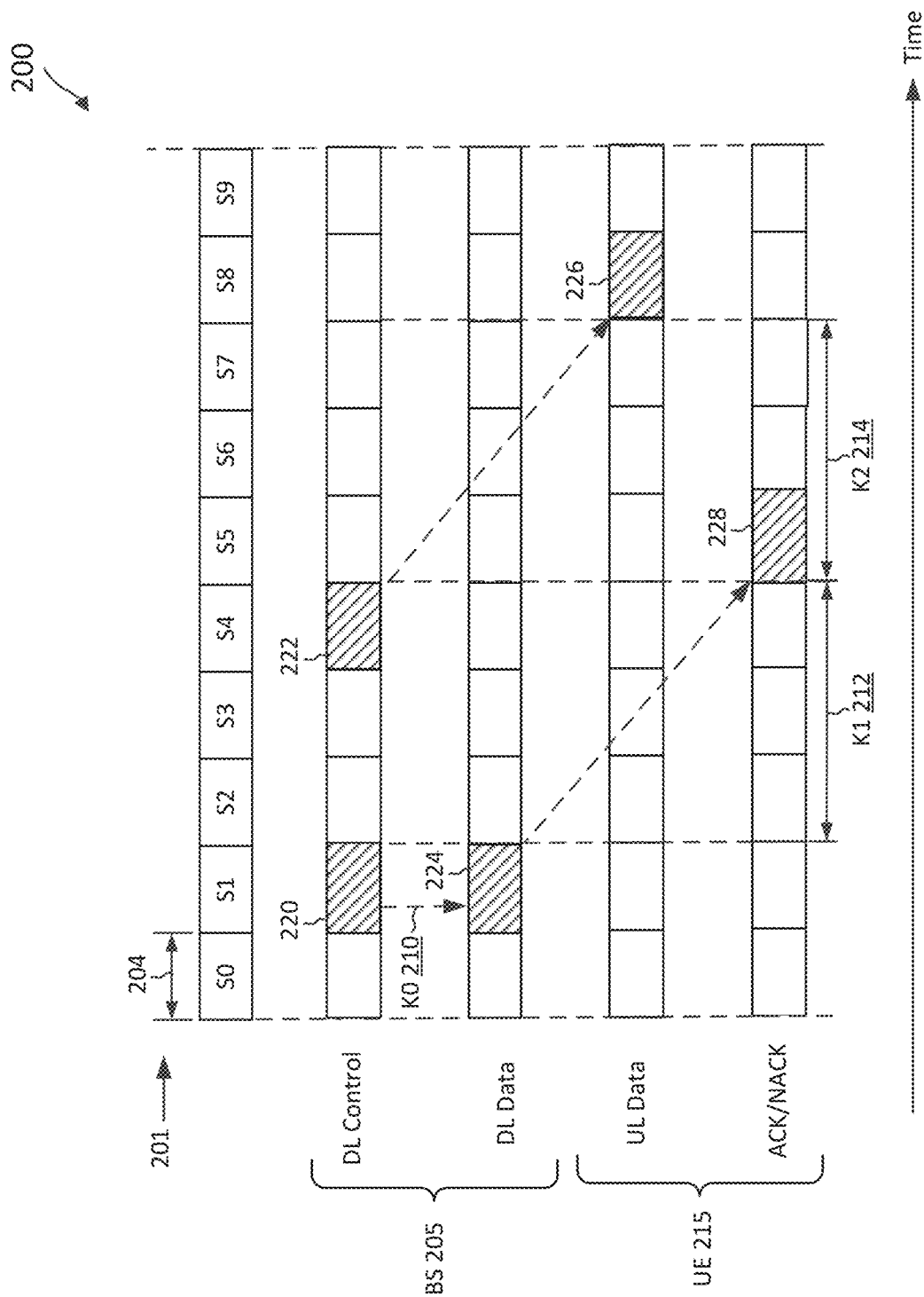
FIG. 2 illustrates a scheduling timeline according to one or more embodiments of the present disclosure.

FIG. 2 illustrates a scheduling timeline 200 according to one or more embodiments of the present disclosure. The scheduling timeline 200 may correspond to a scheduling timeline communicated between a BS 105 and a UE 115 of the network 100. In FIG. 2, the x-axis represents time in some constant units. FIG. 2 shows a frame structure 201 including a plurality of slots 204 in time. The slots 204 are indexed from S0 to S9. For example, a BS may communicate with a UE 215 in units of slots 204. The slots 204 may also be referred to as transmission time intervals (TTIs). Each slot 204 or TTI carry a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

The BS and the UE may further communicate based on a parameter 210, denoted as K0, a parameter 212, denoted as K1, and a parameter 214, denoted as K2. The parameter 210 indicates a time period between a DL grant and a corresponding DL transmission. The parameter 212 indicates a time period between a DL data reception and a corresponding ACK or NACK transmission. The UE transmits an ACK if the UE received the DL data without error and transmits a NAK if the UE received the DL data with error. The parameter 214 indicates a time period between a UL grant and a corresponding UL data transmission. The parameters 210, 212, and 214 may be pre-configured by the network and may be indicated in units of slots 204. In the context of LTE, the parameters 210, 212, and 214 may be indicated in a downlink control information (DCI) carried in a PDCCH.

As an example, the parameter 210 may indicate a value 0 (e.g., K0=0), the parameter 212 may indicate a value of 4 (e.g., K1=4), and the parameter 214 may indicate a value of 4 (e.g., K2=4). The pattern-filled boxes represent transmissions of DL control information, DL data, UL data, an ACK, and/or an NACK in corresponding slots 204. While an entire slot 204 is pattern-filled, a transmission may occur only in a corresponding portion of the slot 204. As shown, the BS transmits DL control information 220 in the slot 204 indexed S1 (e.g., in a DL control portion of the slot 204). The DL control information 220 may indicate a DL grant for the UE in the same slot 204 indexed S1 (e.g., K0=0). Thus, the BS transmits a DL data signal 224 to the UE in the slot 204 indexed S1 (e.g., in a DL data portion of the slot 204). The UE may receive the DL control information 220 and receive the DL data signal 224 based on the DL grant.

After receiving the DL data signal 224, the UE 115 may report a reception status of the DL data signal 224 to the BS by transmitting an ACK/NACK signal 228 in the slot 204 indexed S5 (e.g., in a UL data portion or a UL control portion of the slot 204) based on the parameter 212 (e.g., K1=4). The slot 204 indexed S5 is a fourth slot from the slot 204 indexed S1. The ACK/NACK signal 228 refers to a feedback signal carrying an ACK or an NACK. The UE may transmit an ACK when the reception of the DL data signal 224 is successful. Alternatively, the UE may transmit an NACK when the reception of the DL data signal 224 is unsuccessful (e.g., including an error or failing an error correction).

The ACK/NACK signal 228 may be associated with a hybrid automatic repeat request (HARQ) process. In a HARQ process, a transmitting node may transmit various coded versions of information data to a receiving node. For example, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

The BS further transmits DCI 222 in the slot 204 indexed S4 (e.g., in a DL control portion of the slot 204). The DCI 222 may indicate a UL grant for the UE. The UE transmits a UL data signal 226 to the BS in the slot 204 indexed S8 (e.g., in a UL data portion of the slot 204) based on the UL assignment and the parameter 214 (e.g., K2=4). The slot 204 indexed S8 is a fourth slot from the slot 204 indexed S4.

As can be observed, a BS may indicate scheduling information using relative timing (e.g., an offset time period relative to a current time period in which the scheduling information is communicated).

Figure 3:
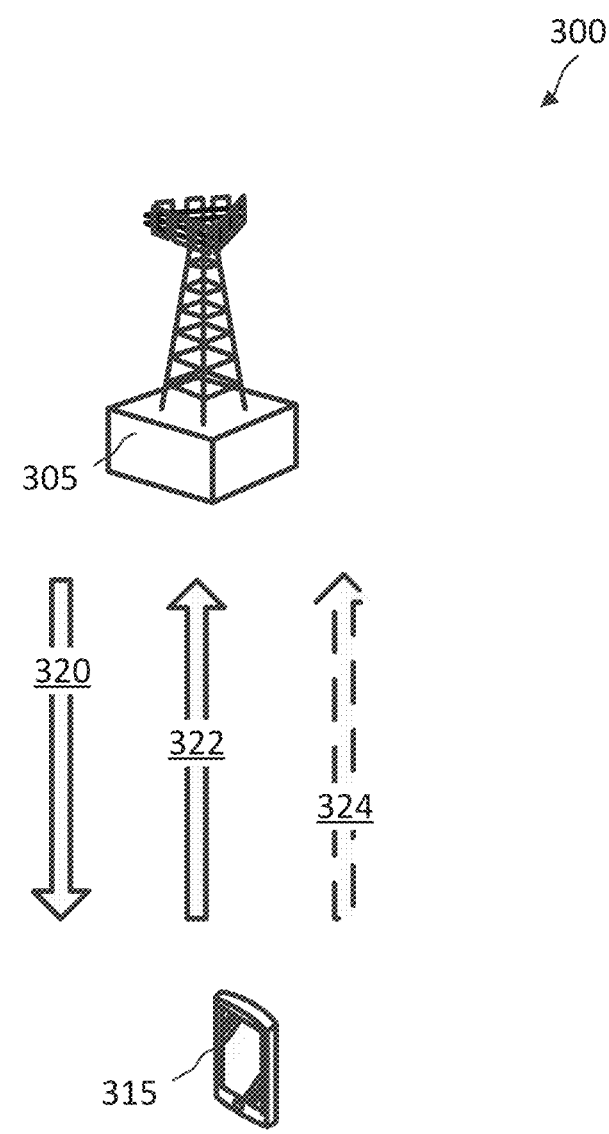
FIG. 3 illustrates a wireless communications network that supports a licensed supplement uplink (SUL) carrier in addition to an unlicensed uplink (UL) carrier according to one or more embodiments of the present disclosure.

FIG. 3 illustrates a wireless communications network 300 that supports a licensed SUL carrier in addition to an unlicensed UL carrier according to one or more embodiments of the present disclosure. FIG. 3 illustrates a BS 305 and a UE 315 for purposes of simplicity of discussion, though it will be recognized that embodiments of the present disclosure may scale to many more UEs 315 and/or BSs 305. The BS 305 and the UE 315 may be similar to the BS 105 and the UE 115, respectively. Additionally, wireless communications network 300 may operate in an unlicensed spectrum that may also be used by other wireless communication devices.

Wireless communications system 300 supports UL transmissions by UE 315 when operating in unlicensed spectrum and/or licensed spectrum. The wireless communications system 300 supports both DL unlicensed band 320 and UL unlicensed band 322, which utilize unlicensed spectrum, and SUL licensed band 324, which utilizes the licensed spectrum. The UE 315 does not need to contend for access to the medium for the SUL licensed band 324 and may utilize it in addition to the available UL unlicensed band 322 for UL transmissions. The BS 305 transmits DL information in the DL unlicensed band 320 to the UE 315. The UE 315 transmits UL information (e.g., UL data or uplink control information (UCI)) in the SUL licensed band 324 and/or in the UL unlicensed band 322 to the BS 305.

In some examples, UE-specific RRC signaling configures and/or reconfigures the location of the PUCCH for UCI transmission, either on the SUL carrier or on a non-SUL carrier in a SUL band combination. In the present disclosure, the terms "non-SUL carrier," "primary UL carrier," and "normal UL carrier" may be used interchangeably. Typically, the default location (e.g., non-SUL carrier) of the PUSCH is the same carrier as used by the PUCCH. While such operation may work well in the licensed spectrum, a problem may arise if the wireless communications system supports both an unlicensed carrier and a licensed SUL carrier. For example, in this scenario, the UE may be unable to transmit PUCCH in the non-SUL carrier. In another example, the BS may be unable to receive PUCCH reliably in the non-SUL carrier.

The BS configures resources (e.g., PUCCH resources) on both the primary UL and the SUL carriers. The primary UL carrier may operate in the unlicensed frequency band, and the SUL carrier may operate in the licensed frequency band. As will be explained in further detail below, the UE may leverage the licensed frequency band to benefit the operation in unlicensed UL and DL.

Figure 4:
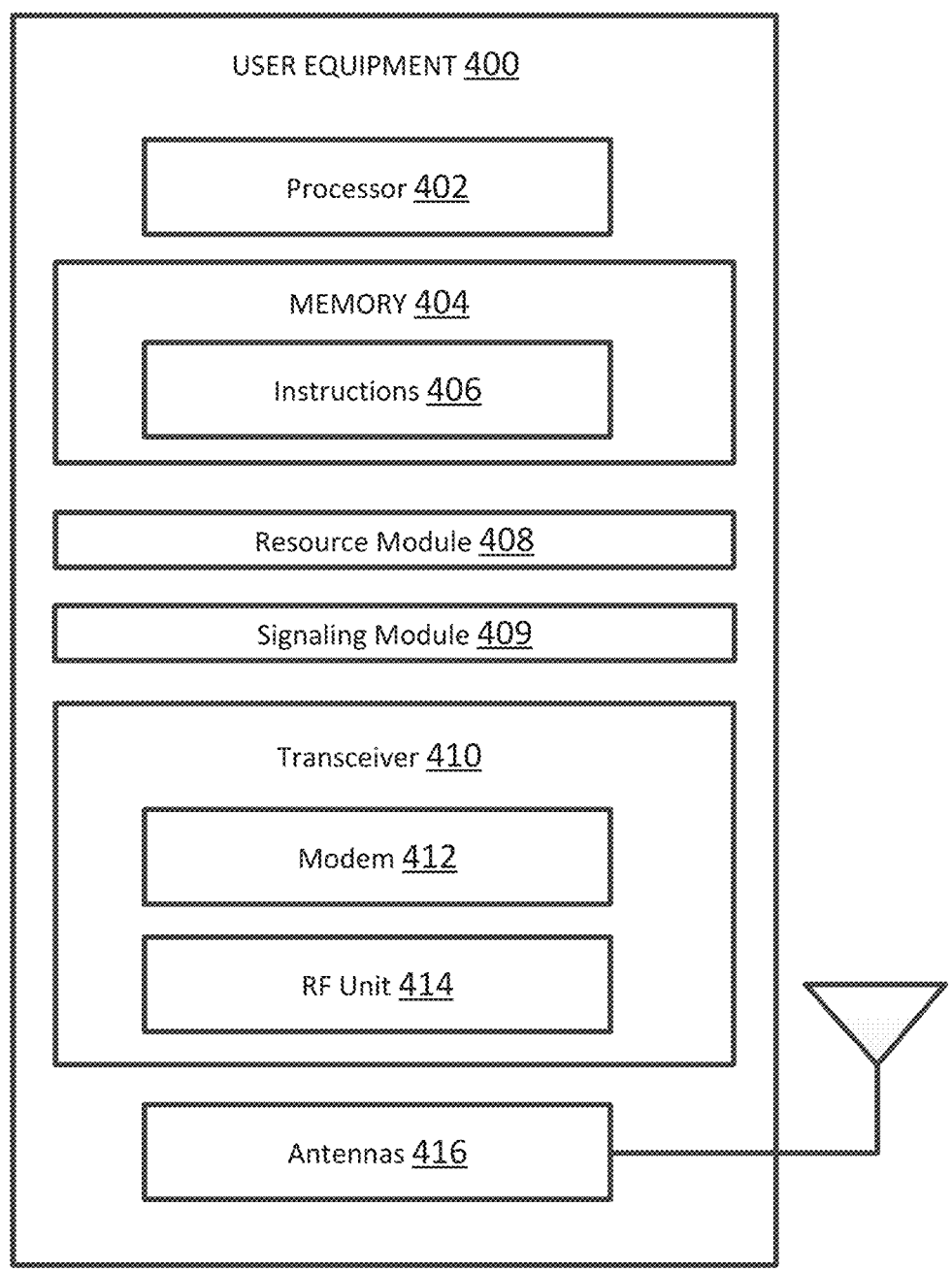
FIG. 4 is a block diagram of an exemplary user equipment (UE) according to one or more embodiments of the present disclosure.

FIG. 4 is a block diagram of an exemplary UE 400 according to one or more embodiments of the present disclosure. The UE 400 may be a UE 115, UE 215, or UE 315 as discussed above. As shown, the UE 400 may include a processor 402, a memory 404, a resource module 408, a signaling module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the resource module 408 and the signaling module 409 may be implemented via hardware, software, or combinations thereof. For example, each of the resource module 408 and the signaling module 409 may be implemented as a processor, circuit, and/or instructions 406 stored in the memory 404 and executed by the processor 402.

The resource module 408 and the signaling module 409 may be used for various aspects of the present disclosure. In some examples, the resource module 408 is configured to receive from a wireless communication device, a configuration indicating a first resource in an unlicensed frequency band and a second resource in a licensed band. In an example, the first resource and/or the second resource may be a UL resource. While the disclosed embodiments are described in the context of PUCCH resource allocations and transmission, similar mechanisms can be applied for PUSCH resource allocations and transmissions.

Referring to FIG. 3 as an example, the resource module 408 may receive a configuration indicating a first PUCCH resource in the UL unlicensed band 322 and a second PUCCH resource in the SUL licensed band 324. As another example, the resource module 408 may receive a configuration indicating a DL resource in the DL unlicensed band 320 and a PUCCH resource in the SUL licensed band 324.

In some examples, the signaling module 409 is configured to communicate with the wireless communication device in the unlicensed frequency band, a first communication signal based on the configuration. Referring to FIGS. 2 and 3 as an example, the signaling module 409 may transmit to the BS in the UL unlicensed band 322, the UL data signal 226 or the ACK/NACK signal 228 based on the configuration. The resources for transmission on the SUL licensed band 324 can be scheduled via configured UL grants or autonomous via grant-free UL resources (e.g., the UL data is autonomous UL data that is not scheduled by the BS). As another example, the signaling module 409 may receive from the BS in the DL unlicensed band 320, the DL data signal 224 based on the configuration.

In some examples, the signaling module 409 is configured to communicate with the wireless communication device in the licensed frequency band, a second communication signal based on at least one of a channel status of the unlicensed frequency band or a transmission parameter associated with at least one of the first communication signal or the second communication signal. The signaling module 408 may determine to transmit the second communication signal in the licensed frequency band rather than the unlicensed frequency band for various reasons. For example, as will be discussed in further detail below, the UE may perform a LBT in the unlicensed frequency band. The channel status of the unlicensed frequency band may refer to a LBT pass or LBT fail. If the LBT results in a pass, the UE may transmit in the unlicensed frequency band the second communication signal. If the LBT results in a fail, the UE may transmit in the licensed frequency band the second communication signal. As will also be discussed in further detail below, the transmission parameter may be associated with a DL data transmission process (e.g., HARQ ACK/NACK). Referring to FIG. 2 as an example, the first communication signal may include the DL data signal 224, and the second communication signal may include an ACK/NACK signal 228 for the DL data. In this example, the transmission parameter is associated with at least one of the DL data signal 224 and the ACK/NACK signal 228 for the DL data because the ACK/NACK timeline corresponds with the transmission of the DL data signal 224 (e.g., parameter 212 in FIG. 2).

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, resource module 408, and/or the signaling module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
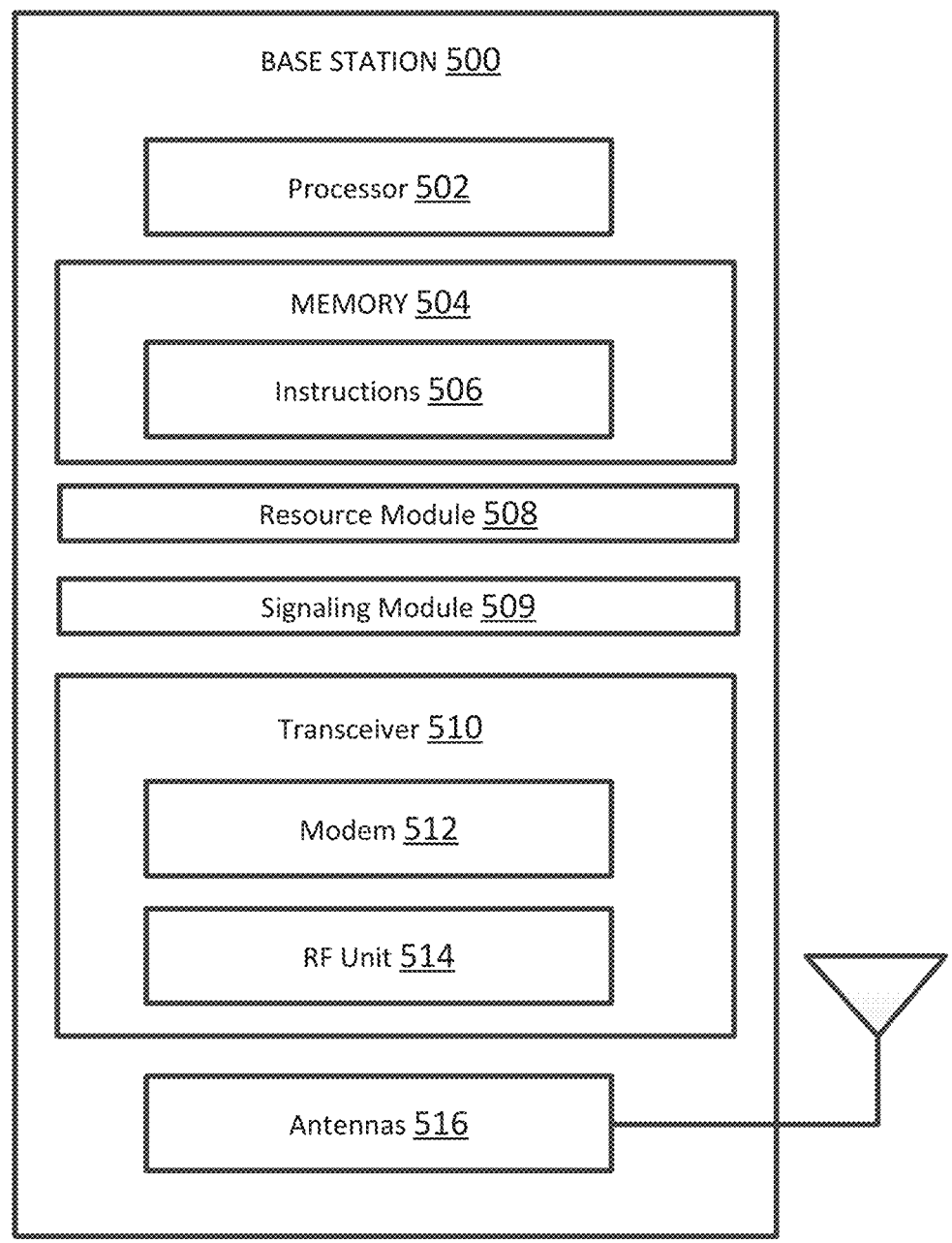
FIG. 5 is a block diagram of an exemplary base station (BS) according to one or more embodiments of the present disclosure.

FIG. 5 is a block diagram of an exemplary BS 500 according to one or more embodiments of the present disclosure. The BS 500 may be a BS 105 or BS 305 as discussed above. As shown, the BS 500 may include a processor 502, a memory 504, a resource module 508, a signaling module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 4.

Each of the resource module 508 and the signaling module 509 may be implemented via hardware, software, or combinations thereof. For example, each of the resource module 508 and the signaling module 509 may be implemented as a processor, circuit, and/or instructions 506 stored in the memory 504 and executed by the processor 502.

The resource module 508 and the signaling module 509 may be used for various aspects of the present disclosure. In some examples, the resource module 508 is configured to transmit to a wireless communication device, a configuration indicating a first resource in an unlicensed frequency band and a second resource in a licensed band. In an example, the first resource and/or the second resource may be a UL resource. Referring to FIG. 3 as an example, the resource module 508 may transmit a configuration indicating a first PUCCH resource in the UL unlicensed band 322 and a second PUCCH resource in the SUL licensed band 324. As another example, the resource module 508 may transmit a configuration indicating a DL resource in the DL unlicensed band 320 and a PUCCH resource in the SUL licensed band 324.

In some examples, the signaling module 509 is configured to communicate with the wireless communication device in the unlicensed frequency band, a first communication signal based on the configuration. Referring to FIGS. 2 and 3 as an example, the signaling module 509 may receive from the UE in the UL unlicensed band 322, the UL data signal 226 or the ACK/NACK signal 228 based on the configuration. As another example, the signaling module 509 may transmit to the UE in the DL unlicensed band 320, the DL data signal 224 based on the configuration.

In some examples, the signaling module 509 is configured to communicate with the wireless communication device in the licensed frequency band, a second communication signal based on at least one of a channel status of the unlicensed frequency band or a transmission parameter associated with at least one of the first communication signal or the second communication signal. Referring to FIGS. 2 and 3 as an example, the signaling module 509 may receive in the SUL licensed band 324, UL data (e.g., UL data signal 226 or ACK/NACK signal 228) based on at least interference experienced on the unlicensed frequency band or a HARQ timeline.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
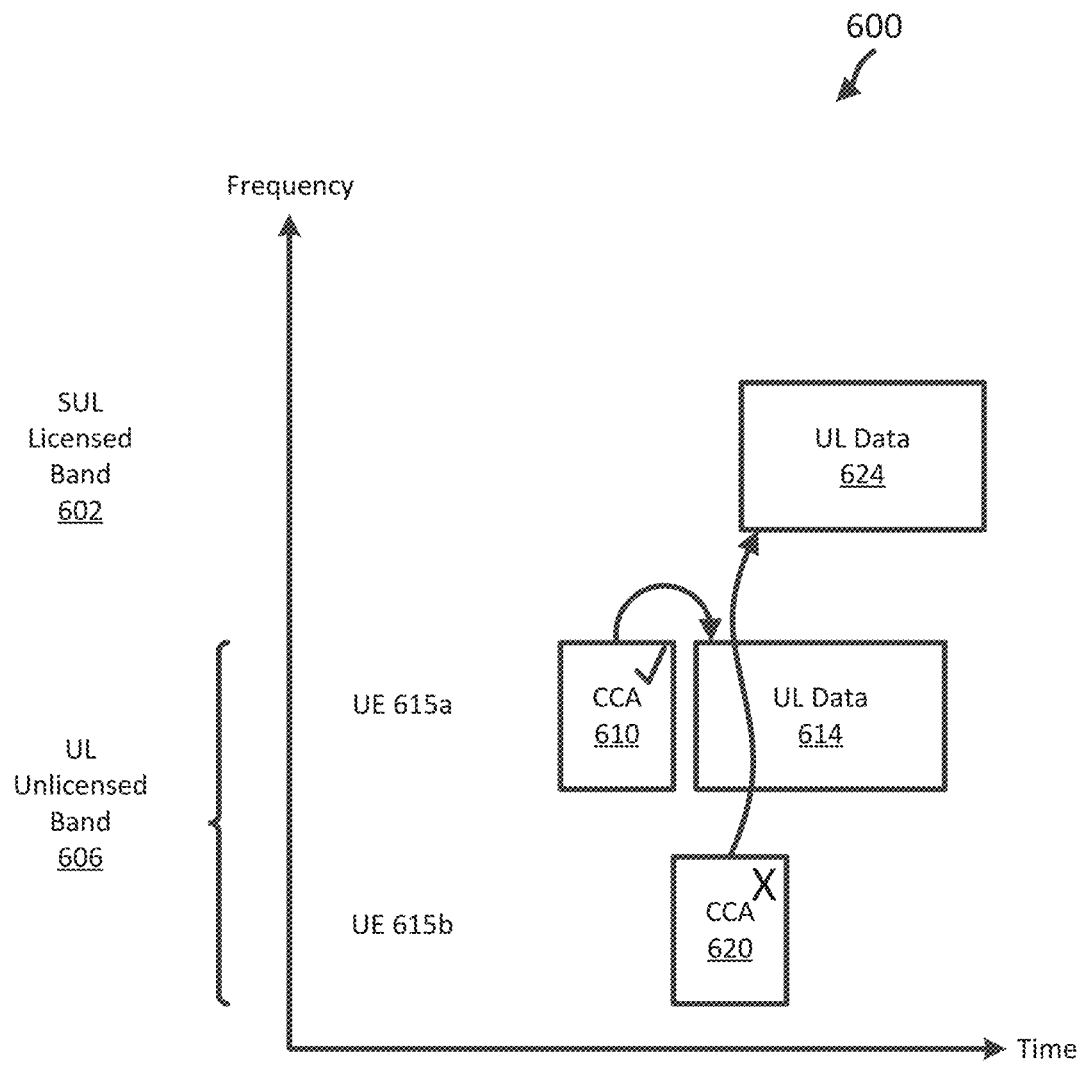
FIG. 6 illustrates a communication scheme in which the UE leverages use of a SUL licensed band based on a channel status of an unlicensed frequency band according to one or more embodiments of the present disclosure.
Figure 7:
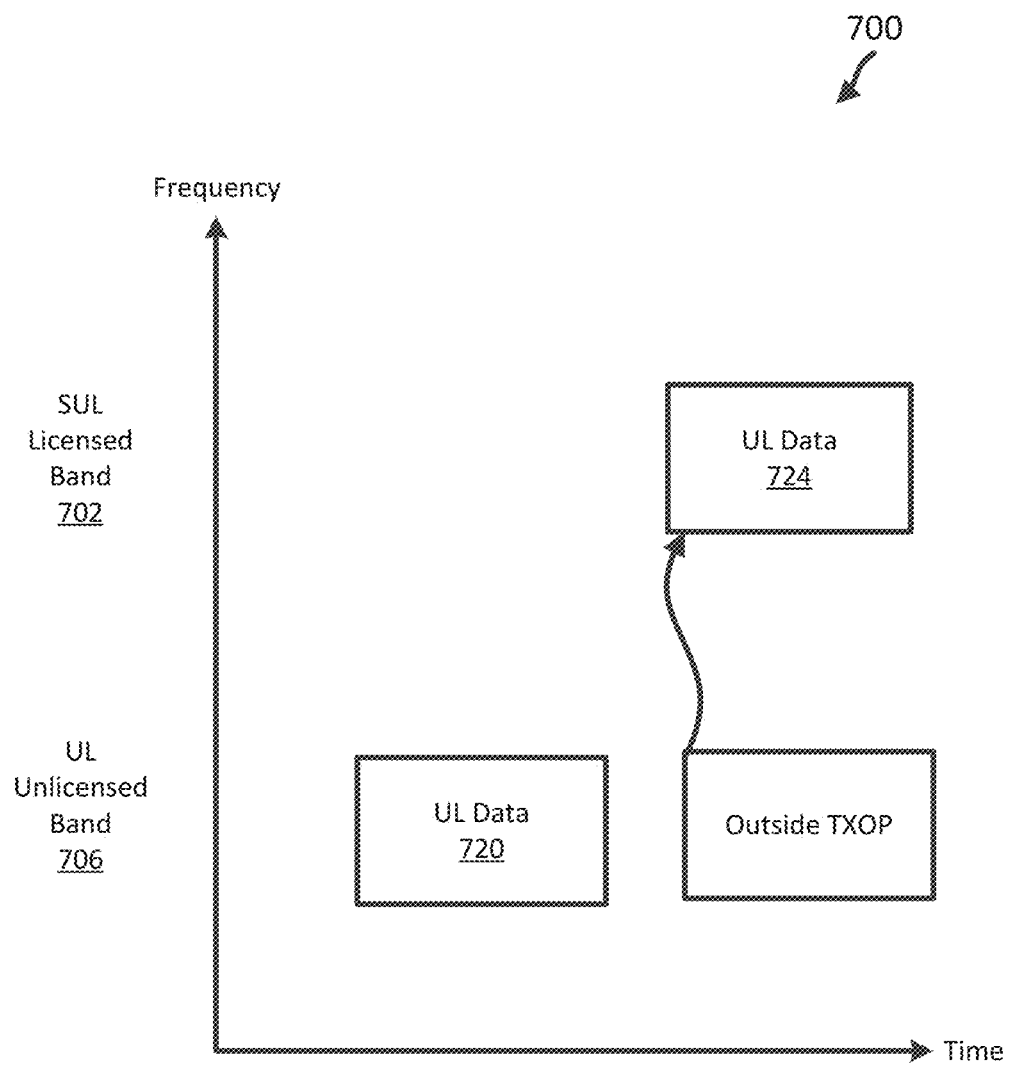
FIG. 7 illustrates a communication scheme in which the UE leverages use of the SUL licensed band based on a transmission parameter according to one or more embodiments of the present disclosure.
Figure 8:
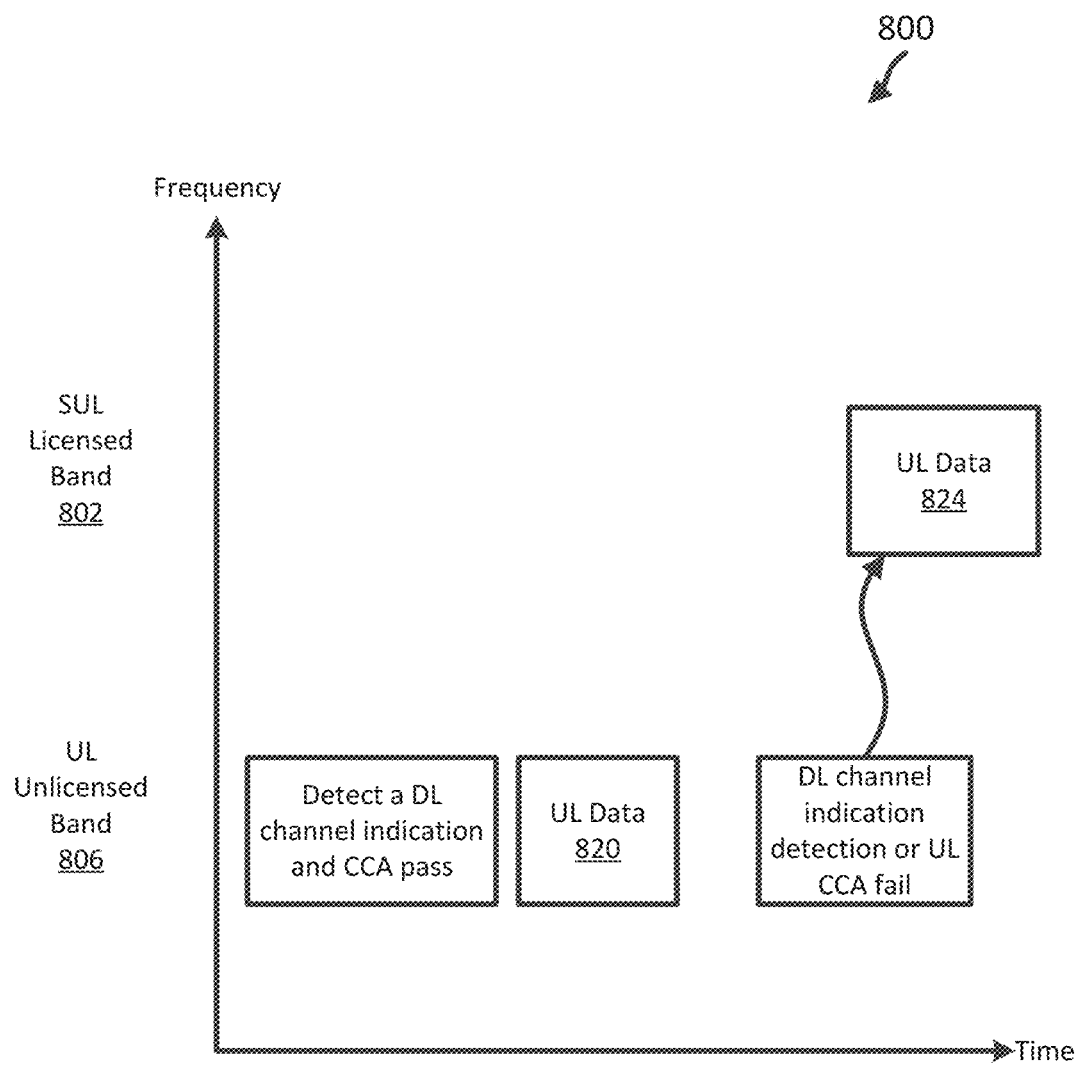
FIG. 8 illustrates a communication scheme in which the UE leverages use of the SUL licensed band based on at least one of a channel status of the unlicensed frequency band or detection of the DL channel indication according to one or more embodiments of the present disclosure.

FIGS. 6-8 illustrate various mechanisms for leveraging licensed frequency band to benefit operation in unlicensed frequency band according to one or more embodiments of the present disclosure. In FIGS. 6-8, the communication scheme 600, 700, 800 may be employed by UEs such as the UEs 115, 315, 400 in a network such as the network 100. Additionally, the x-axes represent time in some constant units, and the y-axes represent frequency in some constant units.

A UE and a BS may communicate via a SUL licensed band and/or an unlicensed band (e.g., UL and DL). The SUL licensed band is different from the UL unlicensed band. The terms "SUL licensed band" and "licensed frequency band" may be used interchangeably. Additionally, the terms "UL unlicensed band" and "unlicensed frequency band" may be used interchangeably. The BS may provision some UL resources on the SUL licensed band to be used by UEs for various reasons. Additionally, the UL resources may be overloaded for use by multiple UEs.

FIG. 6 illustrates a communication scheme 600 in which the UE leverages use of a SUL licensed band 602 based on a channel status of an unlicensed frequency band according to one or more embodiments of the present disclosure. In the communication scheme 600, the UE may utilize a SUL licensed band 602 as a fallback option if the UE does not gain access to the shared medium as a result of a LBT fail. LBT is a channel access scheme that may be used in the unlicensed spectrum.

A wireless communication device may perform a LBT (e.g., based on energy detection and/or signal detection) in the shared channel. The wireless communication device may contend for a TXOP in a shared channel and may perform LBT in the shared channel to receive and/or transmit data on the shared channel. If the wireless communication device is a BS and the LBT passes, the BS may schedule one or more UEs for UL and/or DL communications in the TXOP. In another example, the wireless communication device is a UE 615. If the LBT passes, the UE 615 may access the shared medium to transmit and/or receive data. If the LBT fails, the UE 615 does not gain access to the shared medium for data transmission and/or reception.

In some examples, the BS indicates to the UE 615 to utilize either the SUL licensed band 602 or the UL unlicensed band 606 to transmit PUCCH depending on a channel status (e.g., LBT pass or LBT fail) of the unlicensed frequency band. In this example, the dynamic primary UL/SUL indication on PUCCH is dependent on the interference experienced on the unlicensed frequency band by the UE 615. In an example, the BS may transmit a DL grant for a DL data transmission to the UE. In addition to DL resource allocation information and transmission parameters, the DL grant may include a DCI field (e.g., in DCI 222 of FIG. 2) indicating to the UE 615 which UL carrier to utilize to transmit a communication signal (e.g., UCI). The UCI may include, for example, an ACK/NACK (e.g., ACK/NAK signal 228 of FIG. 2), CSI, or scheduling request (SR). The BS may use the DCI field to indicate to the UE 615 whether to transmit UL data on the SUL licensed band 602 or the UL unlicensed band 606. The UE 615 reads the DCI field and determines, based on the value stored in the DCI field, whether to utilize the SUL licensed band 602 or the UL unlicensed band 606 for UL data transmission. In an example, the DCI field stores one bit indicating to the UE 615 the carrier (e.g., SUL licensed band 602 or UL unlicensed band 606) on which to transmit the UL data (e.g., ACK/NACK feedback). In another example, the DCI field stores two bits, which indicate to the UE which of the two carriers to transmit the UL data (e.g., ACK/NACK) or whether to transmit the UL data on both carriers.

In the example illustrated in FIG. 6, UEs 615a and 615b perform LBT (e.g., CCA) prior to communicating in order to determine whether the channel is available. The BS may provision some UL resources on the SUL licensed band 602 to be used when a UE performs a LBT that results in a fail. The UL resources may be overloaded for multiple UEs. The UEs that have UL data to transmit may first attempt to reserve the unlicensed UL medium for UL transmissions (e.g., autonomous UL via a dynamic UL grant or scheduled UL transmission via a configured UL grant). Referring to the UE 615a, to transmit in the unlicensed frequency band, access by the UE is preceded by a CCA 610 to detect whether the UE 615a can reserve the unlicensed UL medium for data transmission. The determination of whether the UE 615a may reserve the unlicensed medium depends on various factors such as the activity in the unlicensed medium by other communication devices, transmission by higher priority network operating entities, etc. The UE 615a is able to reserve the unlicensed UL medium, and the check mark shown in CCA 610 indicates the LBT pass. After the UE 615a is able to reserve the unlicensed UL medium, the UE 615a transmits the UL data 614 in the UL unlicensed band 606 (e.g., unlicensed primary UL carrier). In an example, the UE 615a transmits the UL data 614 to the BS via a PUSCH and/or a PUCCH.

If the first attempt to reserve the unlicensed UL medium for UL transmissions is unsuccessful (e.g., LBT fail), the UE may utilize the overloaded UL resources on the SUL licensed band 602 for its transmissions. Referring now to the UE 615b, to transmit in the unlicensed frequency band, access by the UE is preceded by a CCA 620 to detect whether the UE 615b can reserve the unlicensed UL medium for data transmission. In the example illustrated in FIG. 6, the UE 615a has already reserved the medium and accordingly, UE 615b is unable to reserve it, and the "X" shown in CCA 620 indicates the LBT fail. In response to the LBT fail, the UE 615b may transmit the UL data 624 in the SUL licensed band 602 (e.g., licensed SUL carrier). In an example, the UE 615b transmits the UL data 624 to the BS via a PUSCH and/or a PUCCH. By transmitting the UL data 624 in the SUL licensed band 602 rather than the UL unlicensed band 606, the uncertainty related to the UE 615b's channel access is removed and the UE 615b is able to transmit the UL data 624 without contending for the medium.

It should be understood that at a later point in time, if the UE 615b performs a LBT that results in a LBT pass, the UE 615b may transmit UL data in the UL unlicensed band 606. Conversely, at a later point in time, if the UE 615a performs a LBT that results in a LBT fail, the UE 615a may transmit UL data in the SUL licensed band 602.

FIG. 7 illustrates a communication scheme 700 in which the UE leverages use of the SUL licensed band based on a transmission parameter according to one or more embodiments of the present disclosure. The transmission parameter is associated with at least one of a first communication signal communicated in the unlicensed frequency band or a second communication signal communicated in the licensed frequency band. The BS may transmit DL data in a current TXOP to the UE, and the first communication signal includes the DL data. In an example, the BS transmits the DL data to the UE, which may or may not receive the DL with errors. The UE may transmit the second communication signal in response to the first communication signal. The second communication signal may be an ACK/NACK for the DL data.

In an example, the BS indicates to a UE to utilize either the unlicensed frequency band or the licensed frequency band to transmit PUCCH depending on the HARQ timeline. The dynamic normal UL (NUL)/SUL indication on PUCCH may be dependent on the HARQ ACK/NACK timeline (e.g., parameter 212 in FIG. 2). The terms "NUL" and "unlicensed UL" may be used interchangeably in the present disclosure. In an example, the UE receives DL data in a current TXOP, and the UE determines based on the HARQ timeline whether an ACK/NACK for the DL data can be transmitted within the current TXOP or falls outside the current TXOP.

In an example, UL data 720 includes a first ACK/NACK for first DL data (not shown) that preceded it, and UL data 724 includes a second ACK/NACK for second DL data (not shown) that preceded it. With regard to the first ACK/NACK, if the UE is able to transmit PUCCH within the current TXOP according to the HARQ timeline, the UE may use the PUCCH resources in the UL unlicensed band 706. In the example illustrated in FIG. 7, the first ACK/NACK may be transmitted within the current TXOP, and accordingly the UE transmits the UL data 720 within the current TXOP in the UL unlicensed band 706. Those UEs scheduled to transmit at an earlier portion within the current TXOP may have the opportunity to transmit ACK/NACK feedback within the current TXOP.

The UEs scheduled toward the end of the current TXOP, however, may have the transmission of their ACK/NACK feedback fall outside the current TXOP. Rather than the UE transmitting the ACK/NACK outside the current TXOP, the BS may indicate to the UE to transmit the ACK/NACK in the SUL licensed band 702 to avoid performing a LBT (e.g., a category 4 LBT in unlicensed frequency band). In this example, if transmission of PUCCH falls outside the current TXOP according to the HARQ timeline, the UE may automatically use the PUCCH resources in the SUL licensed band 702. In the absence of the SUL licensed band 702, these UEs may wait for the next TXOP to transmit ACK/NACK and contend for channel access for the next TXOP to transmit on the UL unlicensed band 706. In the example illustrated in FIG. 7, the UL data 724 (e.g., the second ACK/NACK) may be transmitted in the SUL licensed band 702.

In an example, a first subset of UEs may transmit data without contending for the shared medium within a current TXOP. In this example, the first subset of UEs may utilize the UL unlicensed band 706 for transmission of their ACK/NACK feedback when the ACK/NACK timeline is within the current TXOP. Additionally, a second subset of UEs may use the SUL licensed band 702 for transmission of their ACK/NACK feedback when the ACK/NACK timeline is outside of the current TXOP. Although the BS may be unaware of which UEs will transmit in the SUL licensed band 702, the BS may provision certain resources (e.g., PUCCH resources) on the SUL licensed band 702, and these resources may be overloaded among different UEs. The UEs that utilize the SUL licensed band 702 for data transmission will not experience interference from the other UEs that have already completed their ACK/NACK transmissions.

As shown in FIGS. 6 and 7, the BS may transmit an indication to the UE to utilize either the SUL licensed band or the UL unlicensed band to transmit PUCCH depending on one or more factors such as interference experienced on the unlicensed frequency band or a HARQ timeline. The UE may receive the indication and act accordingly. It should also be understood that the present disclosure is not limited to those techniques discussed in relation to FIGS. 6 and 7, and other techniques that provide the UE with an option to utilize either the SUL licensed band or the UL unlicensed band are within the scope of the disclosure.

In some examples, the BS may allow the UE to select a UL carrier (e.g., between a SUL licensed carrier and a primary unlicensed carrier) for transmission of the PUCCH. The BS may be unaware of the channel status on the UE side and listen for transmissions on both the unlicensed frequency band and the licensed frequency band. In an example, the UE transmits the UL carrier indication (e.g., use of the unlicensed frequency band or licensed frequency band) via a very light channel (e.g., a few bits of information) in the licensed frequency band to indicate which carrier the UE plans to utilize to transmit PUCCH. If the UE determines to use the unlicensed frequency band for PUCCH transmission, the UE may transmit an indication after the PUCCH transmission is completed on the licensed frequency band to indicate the completion of PUCCH transmission.

Additionally, the present disclosure provides techniques for dynamic PUCCH transmissions in the unlicensed frequency band and the licensed frequency band. It should also be understood that other transmissions in the licensed frequency band are within the scope of the present disclosure. For example, Ultra-Reliable Low-Latency Communication (URLLC) transmissions in the SUL licensed band may benefit from the techniques presently provided. In an example, the BS assigns resources for URLLC traffic on both the unlicensed frequency band (e.g., non-SUL carrier) and the licensed frequency band (e.g., SUL carrier). The UE may indicate the URLLC transmission on either of these carriers via a light channel on the licensed frequency band. In an example, the UE reuses the SR channel. In some examples, the BS schedules a first set of URLLC resources for transmission in the unlicensed frequency band and schedules a second set of URLLC resources for transmission in the licensed frequency band.

FIG. 8 illustrates a communication scheme 700 in which the UE leverages use of the SUL licensed band based on at least one of a channel status of the unlicensed frequency band or detection of the DL channel indication according to one or more embodiments of the present disclosure. In the example illustrated in FIG. 8, a UE performs a LBT procedure that results in a LBT pass and detects a DL channel indication from the BS. The UE may transmit UL data 820 in a UL unlicensed band 806 if the UE performs a LBT and achieves a LBT pass and also detects the DL channel indication from the BS. The UE may transmit UL data 824 in a SUL licensed band 802 if the UE performs a LBT that results in a LBT fail or does not detect the DL channel indication from the BS.

In an example, the UE may only resort to the licensed frequency band (e.g., SUL carrier) in response to a LBT fail on the shared medium. In this way, efficient overloading on the licensed frequency band can be achieved by taking the statistical CCA failure rate into account. Alternatively, the BS may schedule initial transmission in the unlicensed frequency band and utilize the licensed frequency band for retransmission when the transmission in the unlicensed frequency band fails. The initial and retransmission resources may be indicated via semi-persistent scheduling (SPS). In an example, the BS may schedule a communication signal for transmission in the unlicensed frequency band. In response to a failure of transmission of the communication signal in the unlicensed frequency band, the BS may schedule the communication signal for transmission in the licensed frequency band.

In some examples, the BS is unable to transmit DL data due to a LBT fail. The UE, as a responding device, may be unable to transmit in the UL unlicensed band 806 if the BS is unable to reserve access to the shared medium. If the UE does not detect the DL channel indication from the BS (e.g., common PDCCH (CPDCCH)), the UE may automatically switch to the SUL resource for UL transmission. In an example, the absence of CPDCCH may switch all UEs from the UL unlicensed band 806 to the SUL licensed band 802.

In addition, the UE may send a SR in the SUL licensed band 802, and the BS may accordingly schedule URLLC UL traffic on the unlicensed frequency band by preempting the potential DL transmission in the unlicensed frequency band. Accordingly, for URLLC traffic, the present disclosure provides techniques for leveraging the SUL licensed band 802 as much as possible, while also transmitting on the UL unlicensed band 806 at times. Accordingly, the UL unlicensed band 806 may be used by those UEs that achieve a LBT pass. Additionally, by distributing the load across the SUL licensed band 802 and the UL licensed band 806, reliability of transmission may be improved and the SUL licensed band 802 may assist in terms of reducing latency for UEs that desire to access the medium right away.

Figure 9:
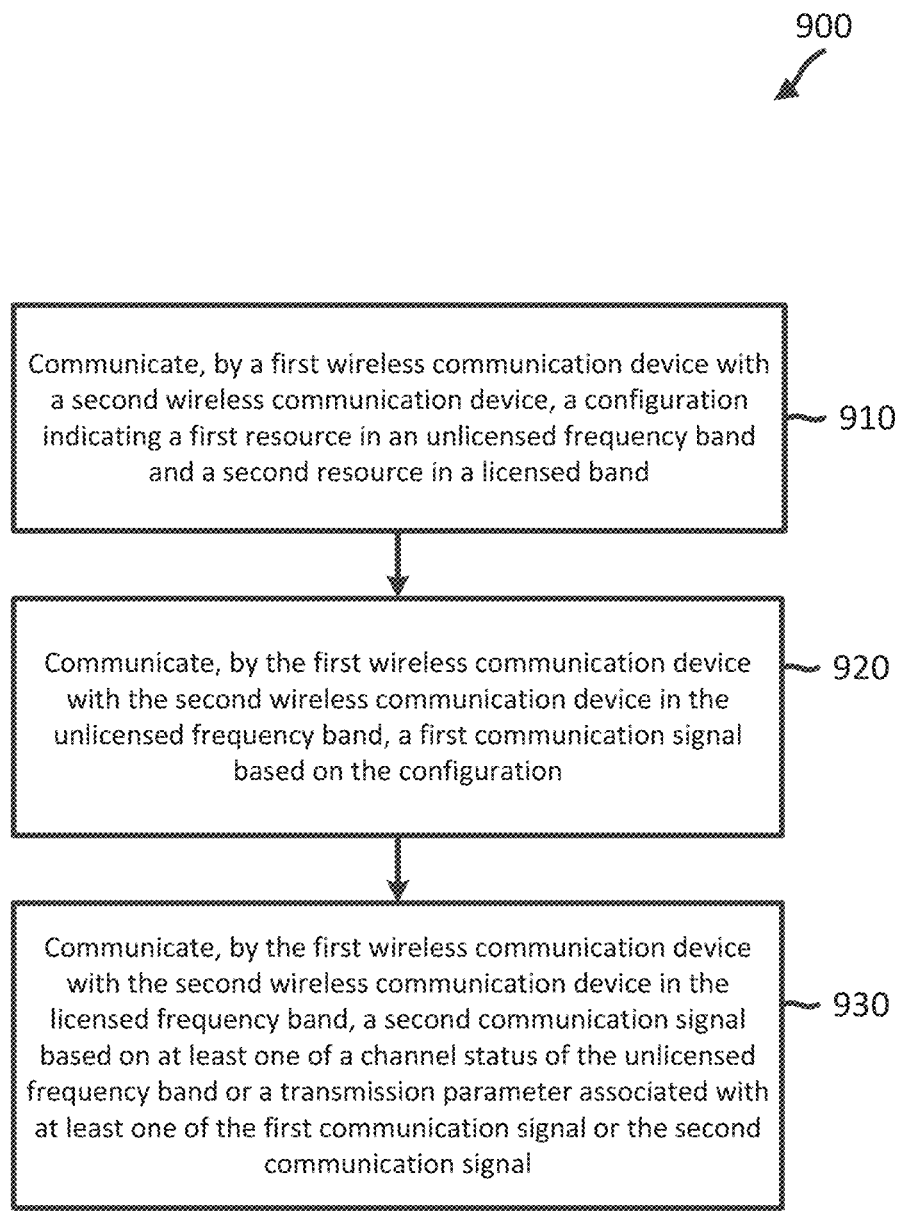
FIG. 9 is a flow diagram of a UL transmission in a licensed frequency band in a communication method according to one or more embodiments of the present disclosure.

FIG. 9 is a flow diagram of a UL transmission in a licensed frequency band in a communication method 900 according to one or more embodiments of the present disclosure. Steps of the method 900 can be executed by a computing device (e.g., a processor, processing circuit, and/or other suitable component) of a wireless communication device, such as the BSs 105, BS 305, and 500 and the UEs 115, UE 315, and 400. The method 900 may employ similar mechanisms as in the schemes 600, 700, and 800 described above with respect to FIGS. 6, 7, and 8, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes communicating, by a first wireless communication device with a second wireless communication device, a configuration indicating a first resource in an unlicensed frequency band and a second resource in a licensed band. The BS may configure multiple resources on the unlicensed frequency band and the licensed frequency band.

At step 920, the method 900 includes communicating, by the first wireless communication device with the second wireless communication device in the unlicensed frequency band, a first communication signal based on the configuration.

At step 930, the method 900 includes communicating, by the first wireless communication device with the second wireless communication device in the licensed frequency band, a second communication signal based on at least one of a channel status of the unlicensed frequency band or a transmission parameter associated with at least one of the first communication signal or the second communication signal.

In another example, the first wireless communication device may correspond to a UE and the second wireless communication device may correspond to a BS. In this example, the UE may receive a configuration including the first resource in the unlicensed frequency band and the second resource in the licensed band.

In an example, the first wireless communication device may correspond to a BS and the second wireless communication device may correspond to a UE. In this example, the BS may transmit a configuration including the first resource in the unlicensed frequency band and the second resource in the licensed band. In an example, the BS receives in the licensed frequency band, the second communication signal based on a channel status of the unlicensed frequency band. If the UE performs a LBT in the unlicensed medium and the LBT results in a pass, the UE transmits in the unlicensed frequency band the UL data. Accordingly, the BS receives in the unlicensed frequency band the UL data. If the UE performs a LBT in the unlicensed medium and the LBT results in a fail, the UE transmits in the licensed frequency band the UL data. Accordingly, the BS receives in the licensed frequency band the UL data. If the BS performs a LBT in the unlicensed medium and the LBT results in a fail, the BS may be unable to send the UE a DL channel indication. If the UE does not detect the DL channel indication, the UE transmits in the licensed frequency band the UL data. Accordingly, the BS receives in the licensed frequency band the UL data.

In another example, the BS receives in the licensed frequency band, a second communication signal based on a transmission parameter associated with at least one of the first communication signal or the second communication signal. The first communication signal may be DL data, and the second communication signal may be ACK/NACK data. If the DL data is received in a current TXOP and the UE determines based on a HARQ timeline that the ACK/NACK is not transmittable in the current TXOP, the UE transmits in the licensed frequency band the ACK/NACK. If the DL data is received in a current TXOP and the UE determines based on a HARQ timeline that the ACK/NACK is transmittable in the current TXOP, the UE transmits in the unlicensed frequency band the ACK/NACK.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a first wireless communication device from a second wireless communication device, an indication to use a licensed frequency band to transmit UL data based on at least one factor;
   receiving, by the first wireless communication device from the second wireless communication device, a configuration indicating a first set of resources for transmission in an unlicensed frequency band and a second set of resources for transmission in the licensed frequency band; and
   transmitting, by the first wireless communication device to the second wireless communication device, a first communication signal in the unlicensed frequency band, and a second communication signal in the licensed frequency band, based on the indication and a transmission failure.

2. The method of claim 1, wherein the transmission failure is determined based on a transmission parameter associated with a HARQ timeline.

3. The method of claim 1, wherein the transmission failure is based on a listen before talk (LBT) result.

4. The method of claim 1, further comprising:
   receiving, by the first wireless communication device from the second wireless communication device, a second indication scheduling the first communication signal for transmission in the unlicensed frequency band.

5. The method of claim 1, wherein the first set of resources are Ultra-Reliable Low-Latency Communication (URLLC) resources, and the second set of resources are URLLC resources.

6. The method of claim 1, wherein the first wireless communication device is a user equipment.

7. The method of claim 1, wherein the second wireless communication device is a base station.

8. The method of claim 1, wherein the first set of resources is a physical uplink control channel (PUCCH) resource, and the second set of resources is a PUCCH resource.

9. A first wireless communication device, comprising:
   a transceiver configured to:

receive, from a second wireless communication device, an indication to use a licensed frequency band to transmit UL data based on at least one factor;

receive, from the second wireless communication device, a configuration indicating a first set of resources for transmission in an unlicensed frequency band and a second set of resources for transmission in the licensed frequency band; and transmit, to the second wireless communication device, a first communication signal in the unlicensed frequency band, and a second communication signal in the licensed frequency band, based on the indication and a transmission failure.

10. The first wireless communication device of claim 9, wherein the transmission failure is determined based on a transmission parameter associated with a HARQ timeline.

11. The first wireless communication device of claim 9, wherein the transmission failure is based on a listen before talk (LBT) result.

12. The first wireless communication device of claim 9, wherein the transceiver is further configured to:

receive, from the second wireless communication device, a second indication scheduling the first communication signal for transmission in the unlicensed frequency band.

13. The first wireless communication device of claim 9, wherein the first set of resources are Ultra-Reliable Low-Latency Communication (URLLC) resources, and the second set of resources are URLLC resources.

14. The first wireless communication device of claim 9, wherein the first wireless communication device is a user equipment.

15. The first wireless communication device of claim 9, wherein the second wireless communication device is a base station.

16. The first wireless communication device of claim 9, wherein the first set of resources is a physical uplink control channel (PUCCH) resource, and the second set of resources is a PUCCH resource.

17. A non-transitory computer-readable medium having program code recorded thereon, the program code comprising:

code for causing a first wireless communication device to receive, from a second wireless communication device, an indication to use a licensed frequency band to transmit UL data based on at least one factor;

code for causing the first wireless communication device to receive, from the second wireless communication device, a configuration indicating a first set of resources for transmission in an unlicensed frequency band and a second set of resources for transmission in the licensed frequency band; and code for causing the first wireless communication device to transmit, to the second wireless communication device, a first communication signal in the unlicensed frequency band, and a second communication signal in the licensed frequency band, based on the indication and a transmission failure.

18. The non-transitory computer-readable medium of claim 17, wherein the transmission failure is determined based on a transmission parameter associated with a HARQ timeline.

19. The non-transitory computer-readable medium of claim 17, wherein the transmission failure is based on a listen before talk (LBT) result.

20. The non-transitory computer-readable medium of claim 17, further comprising:

code for causing the first wireless communication device to receive, from the second wireless communication device, a second indication scheduling the first communication signal for transmission in the unlicensed frequency band.

21. The non-transitory computer-readable medium of claim 17, wherein the first set of resources are Ultra-Reliable Low-Latency Communication (URLLC) resources, and the second set of resources are URLLC resources.

22. The non-transitory computer-readable medium of claim 17, wherein the first wireless communication device is a user equipment.

23. The non-transitory computer-readable medium of claim 17, wherein the second wireless communication device is a base station.

* * * * *